United States Patent
Flament et al.

(10) Patent No.: US 12,260,632 B2
(45) Date of Patent: *Mar. 25, 2025

(54) SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES

(71) Applicant: Open Text Corporation, Waterloo (CA)

(72) Inventors: Arnaud Gilles Flament, Sunnyvale, CA (US); Christopher Dale Lund, San Diego, CA (US); Guillaume Bernard Serge Koch, San Jose, CA (US); Denis Eric Goupil, Sunnyvale, CA (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,885

(22) Filed: Dec. 19, 2023

(65) Prior Publication Data

US 2024/0135700 A1  Apr. 25, 2024

Related U.S. Application Data

(63) Continuation of application No. 17/147,324, filed on Jan. 12, 2021, now Pat. No. 11,893,777, which is a
(Continued)

(51) Int. Cl.
*G06V 10/82* (2022.01)
*G06F 18/214* (2023.01)
(Continued)

(52) U.S. Cl.
CPC ............ *G06V 10/82* (2022.01); *G06F 18/214* (2023.01); *G06F 18/24143* (2023.01);
(Continued)

(58) Field of Classification Search
None
See application file for complete search history.

(56) References Cited

U.S. PATENT DOCUMENTS 10,902,252 B2 * 1/2021 Flament ............ G06F 18/24143
11,625,810 B2    4/2023 Lund et al.
(Continued)

OTHER PUBLICATIONS

Office Action for U.S. Appl. No. 18/179,485, mailed Jun. 25, 2024, 28 pages.

*Primary Examiner* — Leon Flores
(74) *Attorney, Agent, or Firm* — Sprinkle IP Law Group

(57) ABSTRACT

Systems, methods, and computer program products for image recognition in which instructions are executable by a processor to dynamically generate simulated documents and corresponding images, which are then used to train a fully convolutional neural network. A plurality of document components are provided, and the processor selects subsets of the document components. The document components in each subset are used to dynamically generate a corresponding simulated document and a simulated document image. The convolutional neural network processes the simulated document image to produce a recognition output. Information corresponding to the document components from which the image was generated is used as an expected output. The recognition output and expected output are compared, and weights of the convolutional neural network are adjusted based on the differences between them.

20 Claims, 7 Drawing Sheets

Related U.S. Application Data continuation of application No. 16/035,307, filed on Jul. 13, 2018, now Pat. No. 10,902,252.

(60) Provisional application No. 62/533,576, filed on Jul. 17, 2017.

(51) Int. Cl.
  *G06F 18/2413* (2023.01)
  *G06N 3/045* (2023.01)
  *G06N 3/08* (2023.01)
  *G06V 30/14* (2022.01)
  *G06V 30/18* (2022.01)
  *G06V 30/19* (2022.01)
  *G06V 30/413* (2022.01)
  *G06V 30/414* (2022.01)
  *G06V 30/10* (2022.01)

(52) U.S. Cl.
  CPC ............... *G06N 3/045* (2023.01); *G06N 3/08* (2013.01); *G06V 30/1444* (2022.01); *G06V 30/18057* (2022.01); *G06V 30/19173* (2022.01); *G06V 30/413* (2022.01); *G06V 30/414* (2022.01); *G06V 30/10* (2022.01)

(56) References Cited

U.S. PATENT DOCUMENTS

| | | | |
|---|---|---|---|
| 11,893,777 B2 * | 2/2024 | Flament | ................ G06N 3/045 |
| 2014/0270536 A1 | 9/2014 | Amtrup | |
| 2023/0206619 A1 | 6/2023 | Lund et al. | |

* cited by examiner

SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES

CROSS-REFERENCE TO RELATED APPLICATIONS

This application is a continuation of, and claims a benefit of priority under 35 U.S.C. § 120 from, U.S. patent application Ser. No. 17/147,324, filed Jan. 12, 2021, entitled "SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES," issued as U.S. Pat. No. 11,893,777, which is a continuation of, and claims a benefit of priority under 35 U.S.C. § 120 U.S. patent application Ser. No. 16/035,307, filed Jul. 13, 2018, entitled "SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES," issued as U.S. Pat. No. 10,902,252, which claims a benefit of priority under 35 U.S.C. § 119(e) from U.S. Provisional Application No. 62/533,576, filed Jul. 17, 2017, entitled "SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES," all of which are hereby incorporated by reference herein for all purposes.

TECHNICAL FIELD

This disclosure relates generally to the field of image recognition systems, and more particularly to the field of deep learning in fully convolutional neural networks that may be trained using dynamically generated data sets.

BACKGROUND OF THE RELATED ART

Increasingly, businesses require the ability to capture information that is contained in conventional, tangible documents and to transfer this information into their own computer systems. This process typically involves capturing images of the pre-existing documents, identifying areas of the document that contain the desired information (which may include text or other types of information within the document), and interpreting these areas of the document image (e.g., through optical character recognition, image extraction, etc.) to obtain the information. Traditional approaches to this process involve the use of templates that identify the areas of known document types that contain the desired information. Because of the range of document types, these approaches often require large numbers of templates. A great deal of time, effort and expense are usually required to maintain these templates, so the traditional approach is not very efficient and does not scale well. Further, because of the variations in the images, image preprocessing filters are rarely effective, which makes the recognition of text more difficult, even with the proper templates.

It would therefore be desirable to have systems and methods for capturing and extracting information from images that do not have the disadvantages associated with the use of traditional template-based techniques.

SUMMARY OF THE DISCLOSURE

Embodiments disclosed herein make use of deep learning techniques to provide information capture and recognition processes that have a number of advantages over traditional techniques. These deep learning techniques produce recognition system behavior that is generalized, rather than requiring specific image layouts and specific image features, as is the case with template-based systems. This results in a recognition system that is far more robust when dealing with image variations. Additionally, the use of deep learning techniques enables the extraction of non-textual information from the documents, such as images, logos, security features, signatures, and the like. Further, deep learning techniques introduce the possibility of extracting other advanced content from the documents. Deep learning techniques also enable the system to continuously and automatically learn, which increases the robustness and efficiency of the system.

These benefits are provided in a system that uses an advanced recognition platform that implements a deep learning engine in a convolutional neural network. The convolutional neural network can be implemented in a public cloud network. The convolutional neural network may be trained using data that is aggregated across multiple customers. Greater volumes of data result in more effective training, but it is often the case that a company will not readily have access to the vast quantities of pre-existing data necessary to train the convolutional neural network to perform robustly. Further, even if these large amounts of data are available, it may be costly and time consuming to identify expected recognition outputs associated with this data so that the convolutional neural network can be trained (with the input data and associated expected output). Embodiments of the present systems and methods provide means for training the convolutional neural network using dynamically generated training data, thereby eliminating the need for the vast quantities of pre-existing training data that are conventionally required. Also, because the input data is dynamically generated from known information, the expected outputs of processing the known input data are already known with certainty and do not incur the time and expense of conventional systems. After the convolutional neural network is trained with this data, the trained network can be downloaded and executed on-premises to provide a turnkey system for data extraction.

Embodiments disclosed herein provide new systems, methods, and computer program products for image recognition. While particular embodiments are disclosed below, additional aspects, features, and benefits of the invention and example embodiments will be apparent from this disclosure. One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

One embodiment comprises an image recognition system having at least one processor and at least one non-transitory computer readable medium storing instructions which are translatable by processor. The instructions are executable by the processor to receive document components representing one or more feature types, such as text; face; signature; document background; and image background, etc. Each of the document components represents a corresponding one of the feature types, and each of the document components is associated with a corresponding piece of information. The processor selects subsets of the document components and, for each subset, dynamically generates a simulated document from the corresponding document components. Then, one or more simulated document images are dynamically generated from the simulated document. The simulated document images may be generated with one or more image variations which may include, for example, tilting, skewing, lighting variation, cropping, or decentering. The simulated document images and the corresponding pieces of information (both of which are associated with the selected subset of document components forming the simulated document) are input to a learning service that implements training of a fully convolutional neural network. The fully convolutional neural network is trained to recognize the feature types using the pieces of information corresponding to the document components as expected outputs of processing the simulated document images.

The system may be further configured to receive an input image from an input/output device to which it is communicatively connected by a network, and the system may include one or more computers that form a public cloud network. The input/output device may be, for instance, a mobile client device that captures the input images to be processed by the system. The processor may be configured to perform preprocessing (e.g., conversion of colors to grayscale) on each input image prior to providing the preprocessed image to the fully convolutional neural network. In one embodiment, the processor performs, using the trained fully convolutional neural network, a set of convolutional operations on the input image to produce one or more heat maps or bounding boxes. Each of the heat maps indicates a probability of finding a corresponding a corresponding one of the feature types at each pixel in the heat map. Each of the bounding boxes indicates an area of the input image in which there is at least a threshold probability that a corresponding feature type is located. The processor then extracts information of the associated feature type from an area of the input image indicated by the corresponding one of the heat maps or bounding boxes.

Another embodiment comprises a method for extracting information from images, in which a plurality of document components is provided, where each of the document components represents a corresponding feature type and is associated with a corresponding piece of information. One or more subsets of the plurality of document components is selected and, for each of the subsets, a simulated document is dynamically generated from the document components in the subset. A simulated document image is then generated from the simulated document. The simulated document images may include one or more image variations such as tilting, skewing, lighting variation, cropping, or decentering. The simulated document images are then provided to a fully convolutional neural network with the pieces of information corresponding to the document components in the subset. The images and information are provided as inputs to a learning service that implements training of the convolutional neural network. The fully convolutional neural network is then trained to recognize the feature types using the provided pieces of information as expected outputs of processing the associated simulated document images. Training the fully convolutional neural network may comprise performing image recognition processing on the simulated document images to produce a corresponding set of recognition outputs, comparing the recognition outputs to the expected outputs for the images, and adjusting a set of weights of the fully convolutional neural network in dependence upon differences between the recognition outputs and the expected outputs for the images.

The convolutional neural network may receive captured images produced by an input device such as a mobile client device, and may produce heat maps or bounding boxes corresponding to feature types such as text, face, signature, document background, and image background. The captured images may be preprocessed (e.g., colors converted to other formats, reduced to grayscale, or converted to six colors) prior to providing the images to the fully convolutional neural network. The fully convolutional neural network may perform image recognition processing on the captured images, including performing convolutional operations on the images to identify corresponding heat maps or bounding boxes indicating areas of the captured images where corresponding feature types are located. The convolutional neural network may further extract information from the input images, where information of a specific feature type is extracted from the area of the captured image indicated by the corresponding heat map or bounding box.

Yet another embodiment comprises a computer program product including a non-transitory computer-readable medium storing instructions translatable by one or more processors to perform a method in which a plurality of document components is provided, each of the document components representing a corresponding feature type and is associated with a corresponding piece of information. One or more subsets of the plurality of document components is selected and, for each of the subsets, a simulated document is dynamically generated from the document components in the subset. A simulated document image is then generated from the simulated document. The simulated document images may include one or more image variations such as tilting, skewing, lighting variation, cropping, or decentering. The simulated document images are then provided to a fully convolutional neural network with the pieces of information corresponding to the document components in the subset. The images and information are provided as inputs to a learning service that implements training of the convolutional neural network. The fully convolutional neural network is then trained to recognize the feature types using the provided pieces of information as expected outputs of processing the associated simulated document images. Training the fully convolutional neural network may comprise performing image recognition processing on the simulated document images to produce a corresponding set of recognition outputs, comparing the recognition outputs to the expected outputs for the images, and adjusting a set of weights of the fully convolutional neural network in dependence upon differences between the recognition outputs and the expected outputs for the images.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 7 depicts a flow chart illustrating a method for generating a training data set and training a convolutional neural network according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
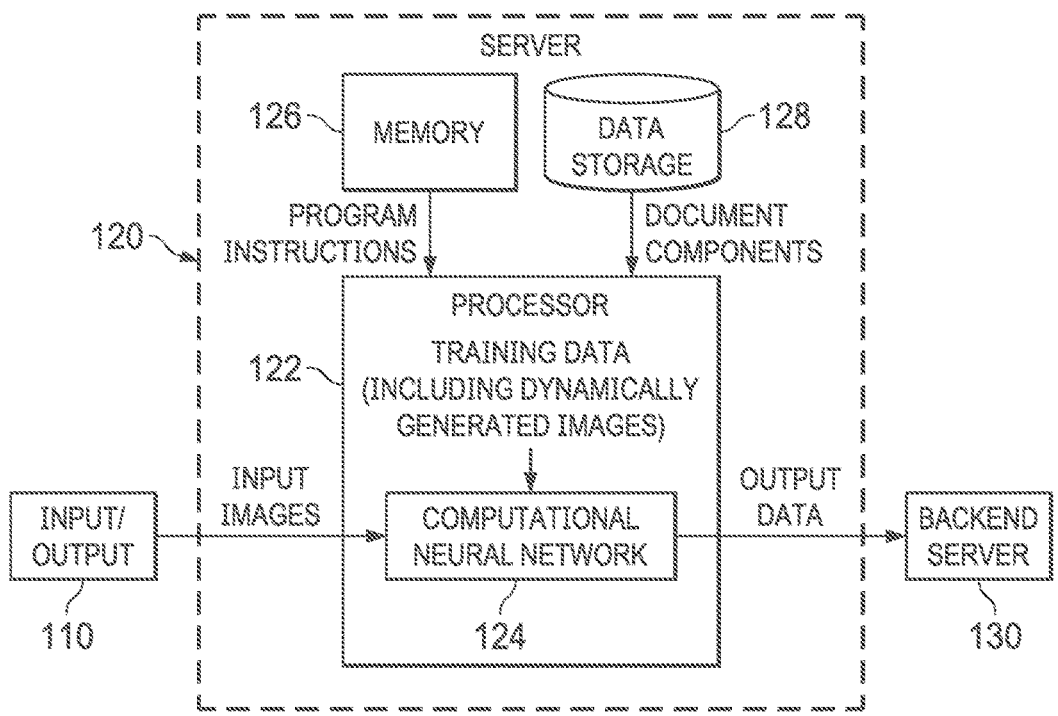
FIG. 1 depicts a high-level diagrammatic representation of an exemplary system for extracting information from images and providing this information to a customer according to some embodiments.

Referring to FIG. 1, a high-level diagrammatic representation of an exemplary system for extracting information from images and providing this information to a customer is shown. In this system, an input/output (I/O) device 110 is provided to capture images from which data is to be extracted. I/O device 110 may, for example, be a mobile phone, a camera, a document scanner, a digital document storage, or any other device suitable for inputting images to the system. I/O device 110 provides images (e.g., photographs, scanned documents, faxes, etc.) to a server 120. Server 120 can be configured for receiving and processing the images from I/O device 110 to extract information from the images. Server 120 utilizes a processor 122 that receives program instructions from a memory 126 which implement a convolutional neural network 124. The program instructions are further configured to enable processor 122 to dynamically generate simulated documents and images of these simulated documents from document components which are stored in data storage 128. The images of the simulated documents, as well as the information contained in the document components, are used to train convolutional neural network 124. The trained convolutional neural network can then identify areas within the input images received from I/O device 110 which contain text, images, signatures and/or other information, and extract the corresponding information (e.g., using optical character recognition to recognize text within the text areas). The extracted information is then provided to a customer or consumer of the information, such as backend server 130. The consumer may be a data storage device, a backend server, a user, or any other consumer of the data.

These documents and images that are dynamically generated by processor 122 may alternatively be referred to by such terms as "dynamically generated", "artificial", "simulated", or "synthetic" to indicate that the documents and images are created by the system using the document components, rather than being copies of pre-existing documents or images of these pre-existing documents. For example, a dynamically generated document to simulate a driver's license may be constructed using randomly selected components such as a name, address, photograph, driver's license number, license format, etc. The simulated document is not associated with a real person, but instead represents a fictitious person. The components individually may contain either real or fictitious information (e.g., an actual, physical address or a fictitious address). It should be noted that, for purposes of this disclosure, a "simulated" image is a real image, but it is an image of a simulated document that has been created from the document components.

Figure 2:
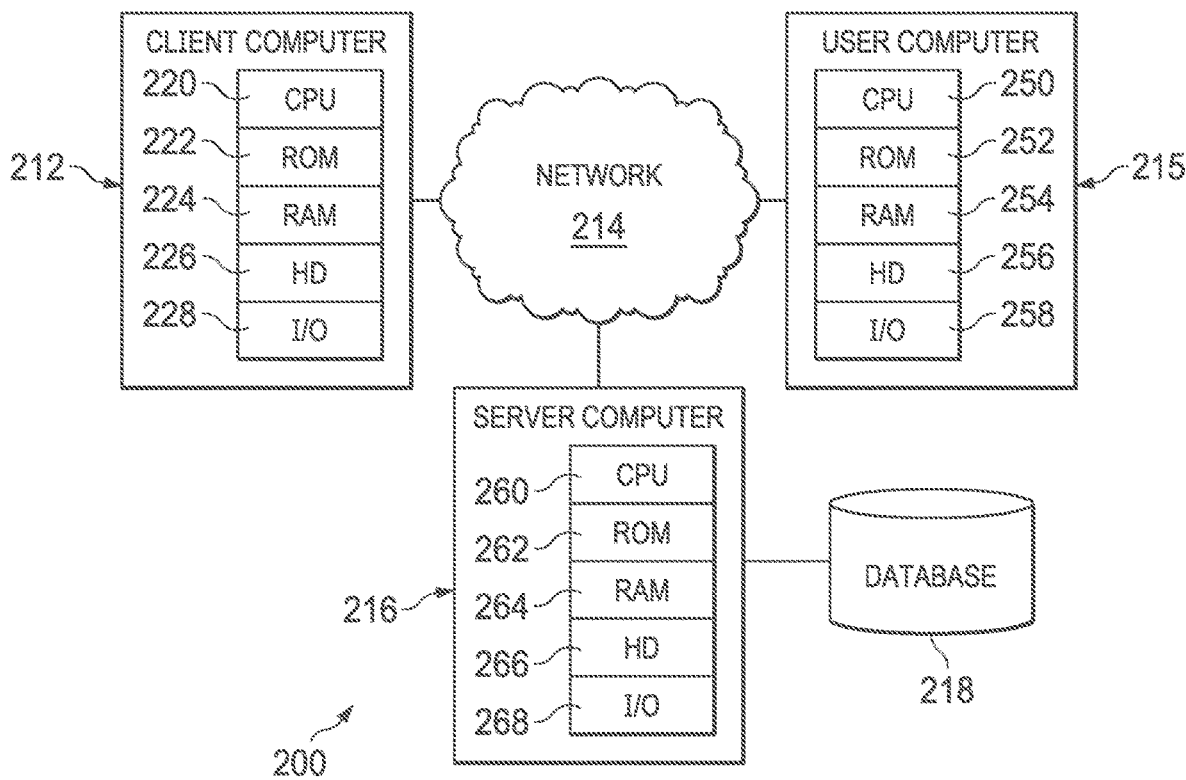
FIG. 2 depicts a diagrammatic representation of a distributed network computing environment where embodiments disclosed can be implemented.

FIG. 2 depicts a diagrammatic representation of a distributed network computing environment where embodiments disclosed herein can be implemented. In the example illustrated, network computing environment 200 includes network 214 that can be bi-directionally coupled to computer 212, computer 215, and computer 216. Computer 216 can be bi-directionally coupled to data store 218. Network 214 may represent a combination of wired and wireless networks that network computing environment 200 may utilize for various types of network communications known to those skilled in the art. In one embodiment, computer 212 may capture images that are provided via network 214 to computer 216, which recognizes and extracts information from the images as disclosed in more detail below. The information extracted from the images may be classified and otherwise interpreted and provided to backend systems implemented on computer 215.

For the purpose of illustration, a single system is shown for each of computer 212, computer 215, and computer 216. However, with each of computer 212, computer 215, and computer 216, a plurality of computers (not shown) may be interconnected to each other over network 214. For example, a plurality of computers 212 and a plurality of computers 215 may be coupled to network 214. Computers 212 may include data processing systems for communicating with computer 216. Computers 215 may include data processing systems for individuals whose jobs may require them to configure services used by computers 212 in network computing environment 200.

First enterprise computer 212 can include central processing unit ("CPU") 220, read-only memory ("ROM") 222, random access memory ("RAM") 224, hard drive ("HD") or storage memory 226, and input/output device(s) ("I/O") 228. I/O 229 can include a keyboard, monitor, printer, electronic pointing device (e.g., mouse, trackball, stylus, etc.), or the like. Computer 212 can include a desktop computer, a laptop computer, a personal digital assistant, a cellular phone, or nearly any device capable of communicating over a network. Computer 215 may be similar to computer 212 and can comprise CPU 250, ROM 252, RAM 254, HD 256, and I/O 258.

Likewise, computer 216 may include CPU 260, ROM 262, RAM 264, HD 266, and I/O 268. Computer 216 may include one or more backend systems configured for providing a variety of services to computers 212 over network 214. These services may utilize data stored in data store 218. Many other alternative configurations are possible and known to skilled artisans.

Each of the computers in FIG. 2 may have more than one CPU, ROM, RAM, HD, I/O, or other hardware components. For the sake of brevity, each computer is illustrated as having one of each of the hardware components, even if more than one is used. Each of computers 212, 215, and 216 is an example of a data processing system. ROM 222, 252, and 262; RAM 224, 254, and 264; HD 226, 256, and 266; and data store 218 can include media that can be read by CPU 220, 250, or 260. Therefore, these types of memories include non-transitory computer-readable storage media. These memories may be internal or external to computers 212, 215, or 216.

Portions of the methods described herein may be implemented in suitable software code that may reside within ROM 222, 252, or 262; RAM 224, 254, or 264; or HD 226, 256, or 266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Figure 3:
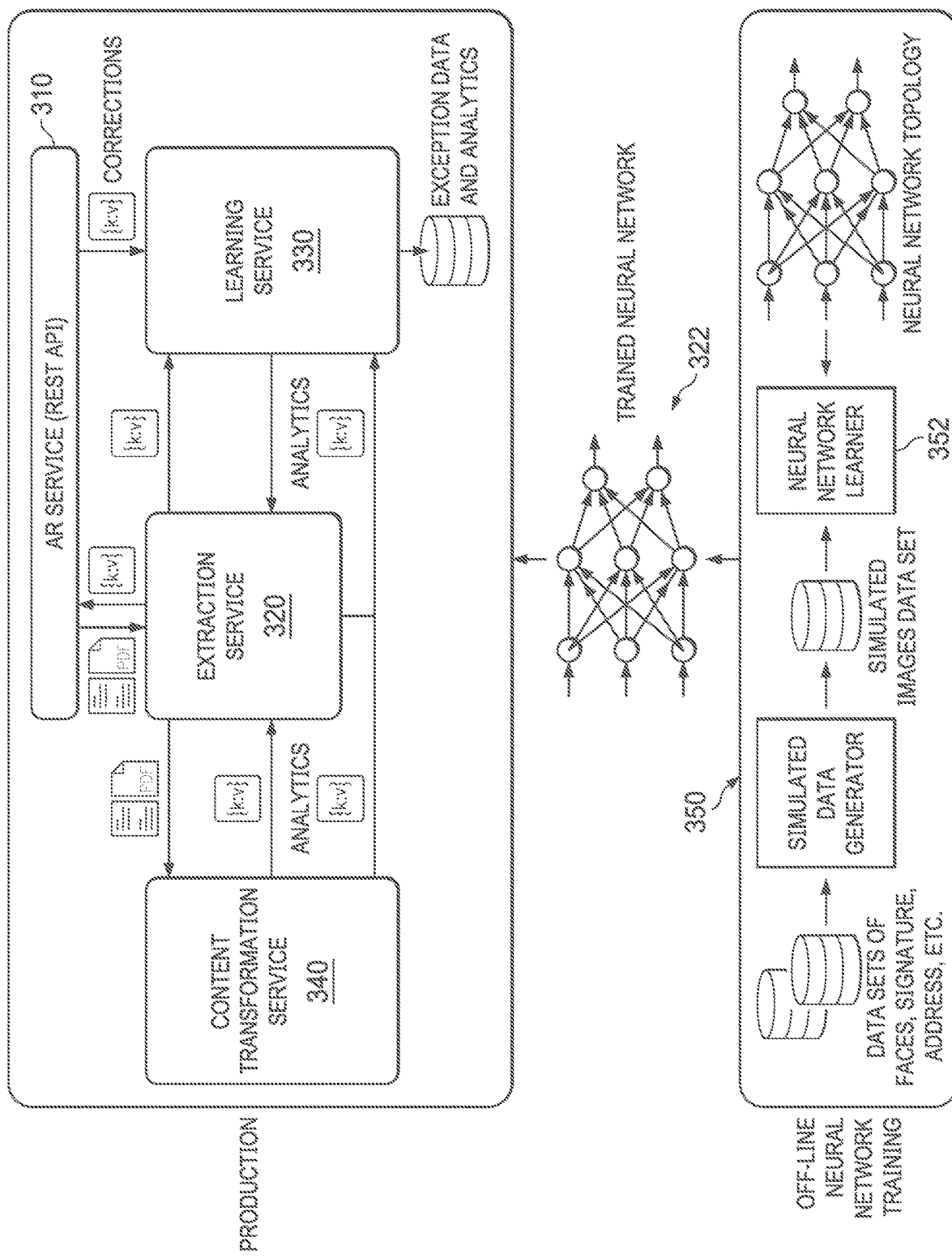
FIG. 3 depicts a diagrammatic representation of an architecture of a data recognition and extraction server according to some embodiments.

FIG. 3 is a diagrammatic representation of the architecture of a data recognition and extraction server in an exemplary embodiment. Extraction service 320 uses a convolutional neural network 322 to identify regions within input images where the desired types of information (e.g., text, images, signatures, etc.) are found. The information can then be extracted from the identified regions of the images. Convolutional neural network 322 is initially trained in one embodiment by a training service 350. In this embodiment, the convolutional neural network is trained offline, and the already-trained network can be downloaded or otherwise provided to the extraction service 320. Because the convolutional neural network has already been trained offline, it can be used immediately by extraction service 320.

As will be described in more detail below, the offline training of the convolutional neural network involves providing document components such as faces, signatures, names addresses, and the like to a simulated document generator, which then generates simulated documents and simulated document images from the document components. The simulated document images and the information from the document components are then used by a neural network learner 352 which implements a learning service to train a convolutional neural network. While the training process implemented by the neural network learner is known in the field, this process conventionally requires vast quantities of actual data. For example, in order to train a convolutional neural network to recognize driver's licenses, it would be necessary to provide large numbers of images of actual driver's licenses to the system. The convolutional neural network would process the images and extract information from the images. This extracted information would then be compared to information that was expected to be extracted, and corrections would be made to the weights of the filters used in the convolution layers of the convolutional neural network in order to improve the network's recognition accuracy moving forward. In many cases, the large amount of pre-existing data (images and expected recognition output) often makes training expensive and impractical (or even impossible). The use of a simulated data generator eliminates the need for a data source that can supply the large numbers of actual document images by generating simulated document images from document components and providing them to the neural network learner.

An application program interface (API) 310 is provided to enable access to the server on which extraction service 320 executes. API 310 allows images to be input to the server so that the server can recognize and extract information from the images. The images that are input through API 310 are provided to extraction service 320, which performs the recognition of relevant portions of the images and extraction of text or other information (images, signatures, etc.) from the relevant portions of the images. Information extracted from the images by service 320 is provided to learning service 330. Correction information is also provided to learning service 330 from API 310. The extracted information and correction information are used by learning service 330 to further train extraction service 320. Information extracted from images provided to service 320 can also be communicated to content transformation service 340, which may transform or interpret the raw data from the extraction service (e.g., identifying text as a name or identifying numbers as a birthdate).

Figure 4:
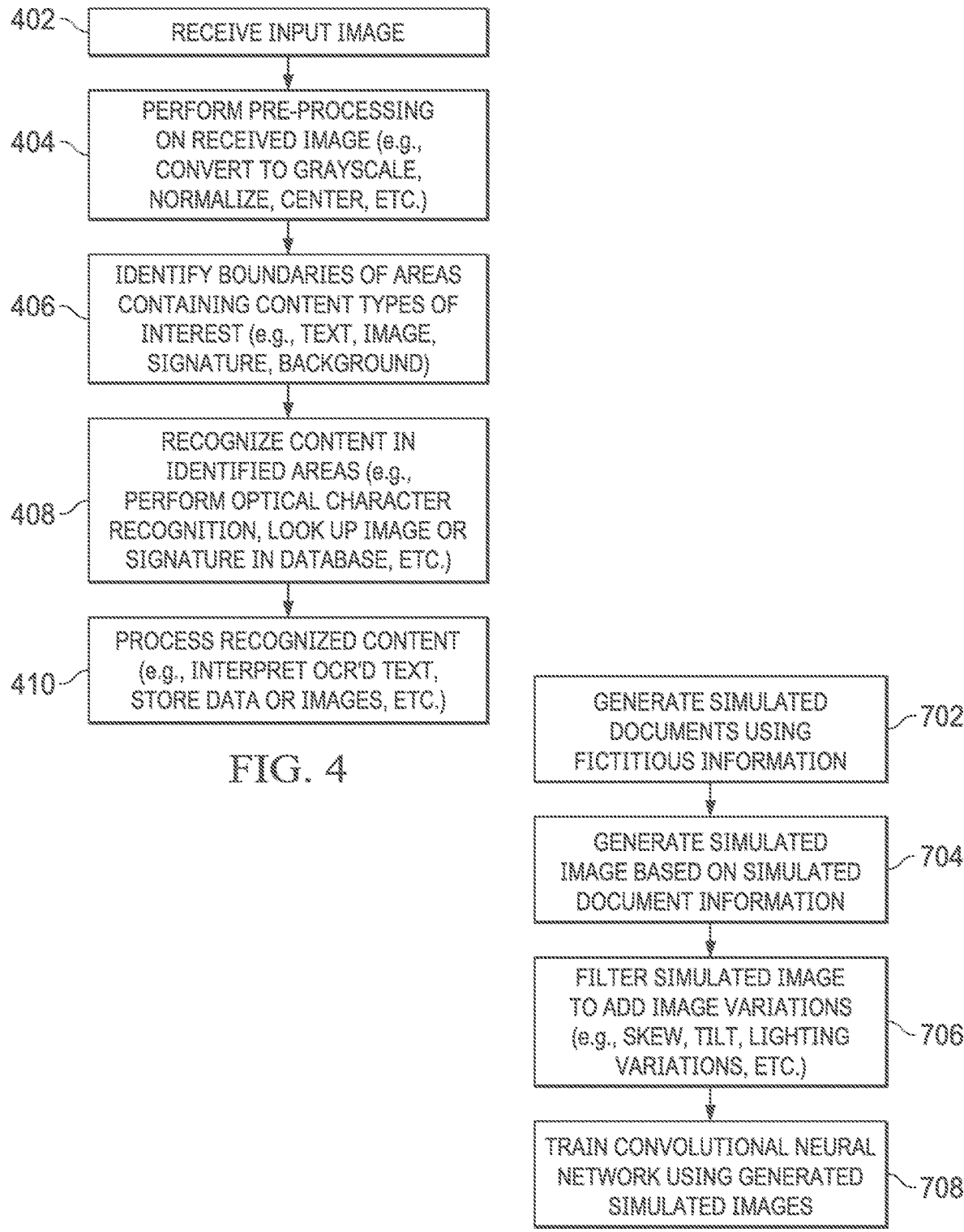
FIG. 4 depicts a flow chart illustrating a method for processing images in a convolutional neural network according to some embodiments.

As noted above, the extraction of information from images using template-based techniques and the maintenance of systems that use these techniques can be very inefficient and ineffective. Extraction service 320 is therefore implemented in one embodiment using a convolutional neural network. This convolutional neural network is designed to process images generally according to the process illustrated in FIG. 4. As depicted in this figure, the process begins when an image is received (402). The received image is initially pre-processed (404). In one embodiment, the pre-processing includes linearizing and centering the image, converting color in the image to gray scale and normalizing the grayscale to a range from −0.5 to 0.5. Normally, each of the colors of the image (red, green, blue) are processed as separate layers, so converting the image to a gray scale (typically ranging from 0-255) reduces these three layers to a single layer, which increases the processing speed of the system. The gray scale is normalized from the range of 0 to 255 to a range of −0.5 to 0.5 in order to improve the learning quality of the system. In alternative embodiments, it may be more desirable to improve the recognition accuracy of the system than to increase the processing speed. In these cases, the original colors of the image (typically red, green, blue) may be retained and the image may be processed with a separate pass for each of the colors. It may even be desirable to perform color separation into additional layers (e.g., defining layers for six different colors) and processing the image for each of these layers to provide improved recognition at the expense of processing speed (which would be ⅙ as fast as when the colors were converted to a gray scale).

After the pre-processing of the image is complete, the image is input to the convolutional neural network (406). The convolutional neural network uses multiple convolutional layers to detect increasingly complex features in the image. These layers produce a set of feature maps which are upscaled and combined with skip layers to produce a corresponding set of maps that are the same size as the input image. Each of the image maps shows a "heat map" that roughly defines the boundaries of a corresponding type of feature within the original image. For instance, one of the maps shows where in the original image text has been detected, while another may show where a face, a signature, document background, image background, or another type of feature has been detected.

Figure 5:
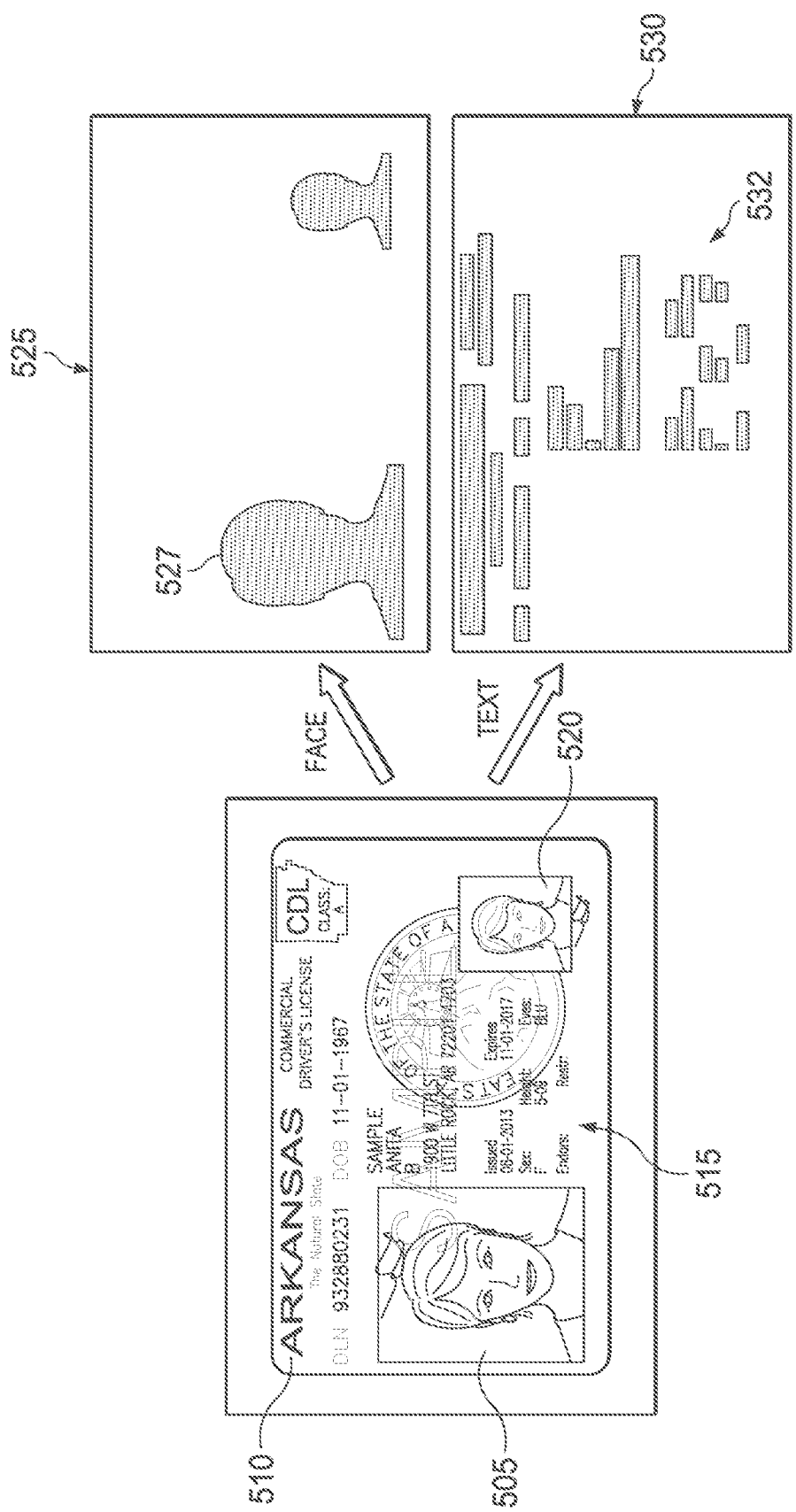
FIG. 5 depicts a diagrammatic representation of an input image such as a driver's license and corresponding image maps showing areas in which faces and text are found according to some embodiments.

Referring to FIG. 5, a diagram is provided to illustrate an input image such as a driver's license and the corresponding image maps showing areas in which faces and text are found. In this figure, the original image of the driver's license includes, for example, a picture of the driver (505), the state that issued the license (510), information associated with the driver (515), and the driver's signature (520). Two of the heat maps produced by the convolutional neural network are depicted in the figure. A first one of the heat maps (525) shows the area (527) of the driver's license in which the driver's face is found. In this case, there is a larger photograph of the driver on the left side of the image, and a smaller photograph on the right side of the image. A second one of the heat maps (530) shows the areas or "bounding boxes" (532) of the license in which text is found. Other heat maps (which for purposes of clarity are not shown in the figure) may also be generated to indicate the locations of other types of features, such as signatures, logos, security features, etc. In some alternative embodiments, the heat maps may identify text with pixel-by-pixel identification of the individual characters.

The heat maps may use colors, shades of gray, or other means to indicate a range of likelihoods of finding a particular feature type at specific locations within the image (e.g., blues and greens may represent lower likelihoods, while oranges and reds represent higher likelihoods). Alternatively, the heat maps may indicate areas that are bounded by distinct lines (bounding boxes), where the portion of the image within a bounding box has an above-threshold likelihood of having the particular feature type and the portion of the image outside the bounding box has a below-threshold likelihood of having the particular feature type. The threshold may be set by default to a predetermined value (e.g., 0.5 on a scale from 0 to 1), or it may be user-configurable. It should be noted that, while the heat maps depicted in FIG. 5 show the image regions as clear lines (e.g., bounding boxes 532) dividing the relevant areas (photos and text) from other areas, the heat maps may more typically indicate (via colors or shades of gray) the probability that each pixel in the map corresponds to the desired feature. As a non-limiting example, the image regions indicated by the bounding boxes (e.g., 532) shown in FIG. 5 illustrate where these probabilities may exceed a threshold probability.

Referring again to FIG. 4, the heat map for text in the image is used in this embodiment to determine the boundaries (e.g., bounding boxes) of the text in the image, and optical character recognition (OCR) is used to detect and/or identify the text within these boundaries (408). Similarly, a heat map for facial images can be used to detect and/or identify the photograph, a heat map for signatures can be used to detect and/or identify a signature, and so on. In some embodiments, the detected/identified information may be used to classify the imaged document (e.g., as a driver's license, invoice, etc.). The recognized characters in the text areas, or text bounding boxes, can then be processed to identify, derive, interpret, extract, and/or infer meaningful information within the text (410). For example, if the characters include "DOB" followed by a set of numbers, the numbers may be interpreted as a birthdate, or if the characters include "HAIR: BR N", the characters may be interpreted to indicate that the associated person's hair is brown. This part of the process may be guided by the context corresponding to the classification of the document. For instance, if the image is classified as a driver's license, a set of numbers may be interpreted as a license number associated with a particular driver, rather than as an invoice number or some other type of number.

In some embodiments, the system may be configured to detect security features in the processed image. Many common documents have security features that are designed to allow verification of the authenticity of the document, prevent unauthorized copying of the document, or otherwise secure the document. For example, a driver's license will commonly have such features as holograms or background images which are visible when the license is copied and when viewed by the human eye. Checks commonly have both watermarks that are visible to the human eye and security backgrounds which may not be visible to the human eye but, when copied, the word "VOID" appears in the image. It may be useful to recognize such security features in images that are processed by the present systems and methods.

For instance, in some embodiments, it may be desirable to detect and identify security features in an image in order to verify that the image represents an authentic document. In this case, the convolutional neural network may generate a heat map for the security feature so that the feature can be extracted, identified or otherwise verified by the system. In other embodiments, it may be helpful to identify a security feature or other type of background in order to be able to remove, minimize or otherwise account for this background so that text or other features in the document are more easily recognizable. In the example of the "VOID" security background of a check, the background image commonly overlaps with other features on the check, such as text indicating a payor, a payee, an amount, a routing number, etc. The overlapping security image can make it more difficult to identify and recognize the text with which it overlaps. Some embodiments may therefore be configured to generate a heat map for the background image, identify the background image within the area(s) shown in the heat map, and account for the background image when extracting other types of features from the areas that are overlapped by the background image. The system may thereby increase the accuracy of recognition of the features that are overlapped by background features in an input image.

As noted above, the main part of the extraction service is implemented in a convolutional neural network. Conventional convolutional neural networks that are used to recognize information within images have a number of convolutional layers that are followed by a fully connected layer (see Y. LeCun, et al., "Gradient-Based Learning Applied to Document Recognition", Proc. Of the IEEE, November 1998). The convolutional layers identify features within the image, and the fully connected layer identifies which of a set of possibilities is most likely represented by the image. In the embodiments disclosed herein, on the other hand, the convolutional neural network is fully convolutional—it has no fully connected layer. Consequently, it does not produce a unique probability for each classification of an image, but instead produces a set of maps that indicate the image regions in which different types of information are found.

Figure 6:
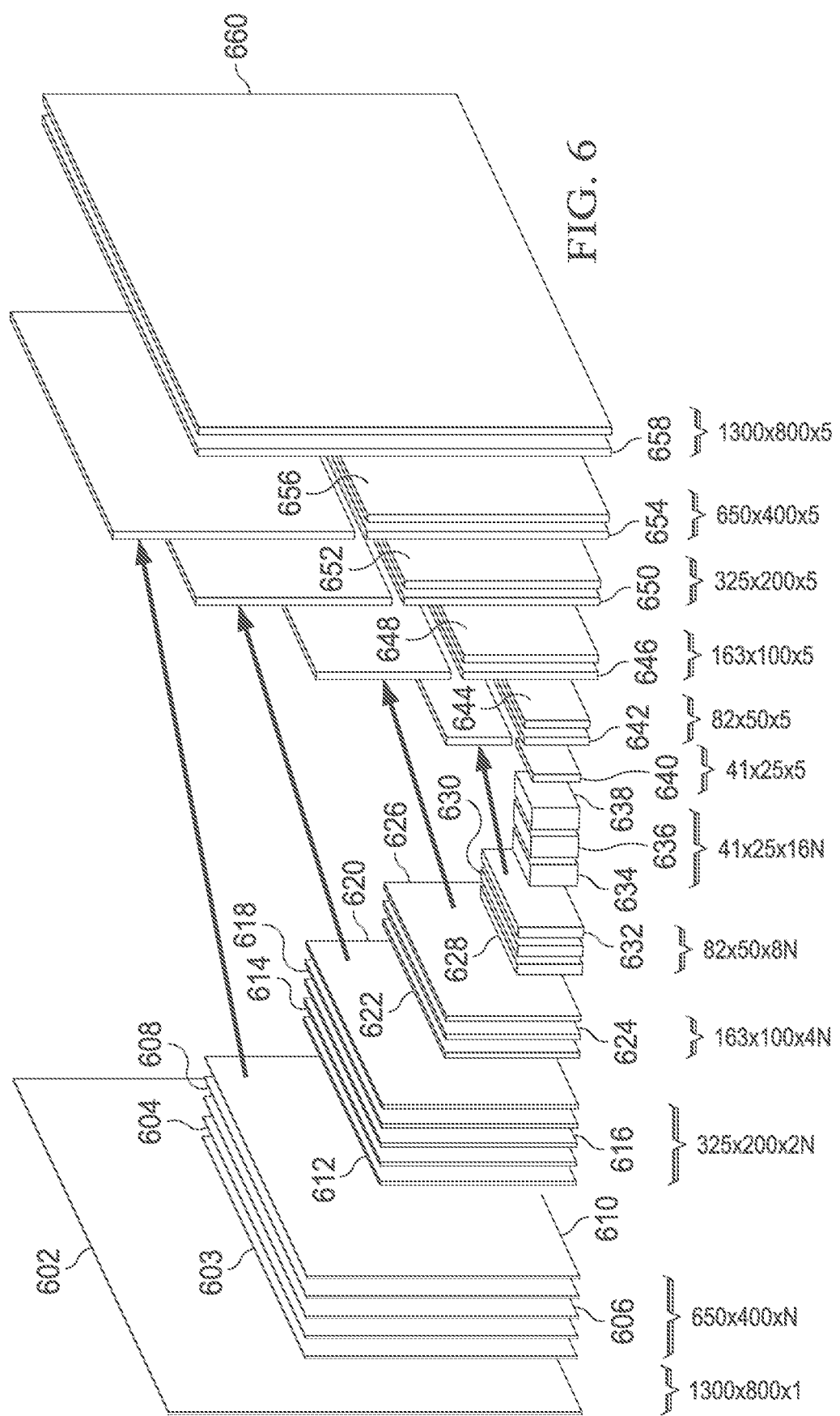
FIG. 6 is a diagrammatic representation of the topology of a convolutional neural network according to some embodiments.

Referring to FIG. 6, a diagrammatic representation of the topology of a non-limiting example of a convolutional neural network according to one embodiment is shown. In the example of FIG. 6, each operation is represented by a resulting feature map. The image 602 that is input to the convolutional neural network is shown at the left side of the figure. The image is processed from left to right in the figure. In this example, the convolutional neural network has three parts.

The first part of the convolutional neural network can include a series of layers that perform operations including convolution operations, average pooling operations, max pooling operations layers, and the like to identify relevant features in the image. These convolutional layers produce a set of feature maps that are smaller than the original input image, which in this example can be 1300 by 800 pixels. Characteristics of each of the feature maps in the first part of the convolutional neural network are shown in Table 1 below. These characteristics include height, width, kernel size and number of features.

second convolutional layer. In this layer, a first max pool operation (612) is performed. The max pool operation results in a set of feature maps that are 325×200 pixels in size and have 2N (2*N) features. These feature maps again undergo a stack of four operations (614-620), where each of the operations includes a convolution, a batch normalization and a rectified linear unit. In this embodiment, the convolutions again use a 5×5 kernel. The operations produce feature maps that are 325×200 in size and have 2N features.

After the operations in the second layer has been performed, the resulting feature maps are processed by a third convolutional layer that includes a second max pool operation (622) that results in a set of feature maps which are 163×100 pixels in size and have 4N features. The resulting feature maps are then processed by a stack of two operations (624-626), where each of the operations again includes a convolution, a batch normalization and a rectified linear unit. In this layer, the convolutions use a 3×3 kernel. The operations produce feature maps that are 163×100 in size and have 4N features.

Following completion of the third of convolutions, the resulting feature maps are processed by a fourth convolutional layer that begins with a third max pool operation (628). This max pool operation produces a set of feature maps which are 82×50 in size and have 8N features. This set of feature maps is then processed by a stack of two operations 630-632), where each of the operations includes a

TABLE 1

| Layers | 602 | 603 | 604-610 | 612 | 614-620 | 622 | 624-626 | 628 | 630-632 | 634 | 636-638 |
|---|---|---|---|---|---|---|---|---|---|---|---|
| Width | 1300 | 650 | 650 | 325 | 325 | 163 | 163 | 82 | 82 | 41 | 41 |
| Height | 800 | 400 | 400 | 200 | 200 | 100 | 100 | 50 | 50 | 25 | 25 |
| Kernel | — | — | 5 × 5 | — | 5 × 5 | — | 3 × 3 | — | 1 × 1 | — | 1 × 1 |
| Features | 1 | 1 | N | N | 2 × N | 2 × N | 4 × N | 4 × N | 8 × N | 8 × N | 16 × N |

In the second part of the convolutional neural network, these reduced-size feature maps are used to generate a set of heat maps, each of which corresponds to the likelihood that a particular type of feature (e.g., text, image, etc.) is present in a specific part of the image. These heat maps can then be processed by a third part of the convolutional neural network via a series of convolution transpose layers and skip layers to upscale the heat maps to the size of the input image. Ultimately, the convolutional neural network produces a final set of heat maps (660) that are the same size as the original input image, where each of the heat maps shows the probability that a feature of a particular type (e.g., text or an image) is found at each pixel.

In the example of FIG. 6, the first part of the convolutional neural network can have five convolutional layers. The first operation performed on the input image is an average pool (603), where each set of 2×2 pixels is averaged, thereby producing an image that is half the size of the input image (650×400 in this example). The reduced-size image then undergoes a first layer of convolutions that has a stack of four operations (604-610), where each of the operations includes a convolution, a batch normalization (see https://www.tensorflow.org/api_docs/python/tf/nn/batch_normalization) and a rectified linear unit (RELU). The convolutions may, in one embodiment, use a 5×5 kernel to produce feature maps that are 650×400 in size and have a number, N, of features.

After the stack of operations in the first layer has been completed, the resulting feature maps are processed by a convolution, a batch normalization and a rectified linear unit. In this layer, the convolutions use a 1×1 kernel, and the resulting feature maps are 82×50 in size, with 8N features.

After the fourth layer of convolutions is completed, the feature maps are processed by a fifth convolutional layer. The first operation in this layer is a fourth max pool (634). This max pool operation produces a set of feature maps which are 41×25 in size and have 16N features. These feature maps undergo a stack of two operations (636-638), where each of the operations includes a convolution, a batch normalization and a rectified linear unit. In this layer, the convolutions use a 1×1 kernel. The resulting feature maps are 41×25 in size, and have 16N features.

The second part of the convolutional neural network is a single convolution operation which produces output layer 640. This operation includes a convolution and a batch normalization. The convolution is performed with a 1×1 kernel and produces a set of heat maps from the feature maps. In one embodiment, the 16N features of the feature maps are used to identify five types of features—text, face, signature, document background and image background.

Because it is more accurate to have heat maps that are the same size as the input image, the 41×25-pixel heat maps can be upscaled in the third part of the convolutional neural network (as optimized by the network) to the size of the input image. This process can be accomplished through the use of four skip layers, and a final upscale layer. Each of the skip layers can include a transposed convolution of the previous feature maps, which is upscaled by a factor of 2.

The feature maps from a previous layer go through a convolution layer with a 1×1×5 kernel, and are summed with the output of the upscale layer. (It should be noted that, in the example of FIG. 6, each of the operations in the third part of the convolutional neural network are performed on the images for each of the 5 features types.) For instance, in the first skip layer, a convolution transpose of 41×25 heat map 640 produces 82×50 map 642. This map (642) can then be added to map 632 from the fourth convolution layer to produce 82×50 map 644. This map includes the heat map information of map 642 and the finer-grained map information contained in map 632.

In the second skip layer, a convolution transpose 646 of output map 644 of the first skip layer, upscaled by 2, can be added to map 626 from the third convolution layer to produce map 648. This produces a map having a size of 163×100, which again has the heat map information of map 646 and the finer-grained map information contained in map 626. Similarly, in the third skip layer, a convolution transpose 650 of the output map of the second skip layer, upscaled by 2, can be added to map 620 from the second convolution layer to produce map 652, and in the fourth skip layer, a convolution transpose 654 of the output map of the third skip layer, upscaled by 2, can be added to map 610 from the first convolution layer to produce map 656.

The output of the fourth skip layer (map 656) is still smaller than the input image. (In the example of FIG. 6, it is 650×400 pixels, as compared to 1300×800 pixels for the input image). The convolutional neural network of FIG. 6 can therefore include an upscale operation to produce output layer 658 which is effectively the reverse of the initial average pool operation. Finally, a softmax operation can be performed to produce output layer 660 so that the final heat maps will show probability distributions of the respective features, rather than raw data.

While the fully convolutional neural network depicted in FIG. 6 is unique, it is still necessary to train the network. Training of convolutional neural networks can be performed by processing images and comparing the actual results of the processing (e.g., identification of text in the image) with expected outputs. Differences between the actual and expected outputs are then used to adjust the weights used in the convolution layers. The quality of the output of the convolutional neural network can improve with more training.

Traditionally, training has been performed using input images for which the expected output is determined through means other than the convolutional neural network. For instance, a person might view an image, identify text in the image, and then record the text as the expected output of processing by the network. Due in part to the need to determine the expected output for each image, it has traditionally been difficult to provide large amounts of training data. Embodiments disclosed herein may include methods for providing much larger sets of training data than were traditionally available.

Referring to FIG. 7, a flow chart illustrating an example of a method for generating a training data set according to some embodiments is shown. As depicted in this figure, the method begins with the generation of a simulated document (702). In a convolutional neural network that is designed to recognize features of a driver's license, an input image may be expected to have corresponding image elements. For instance, the image may include a photo of the driver's face, the driver's signature, text corresponding to some of the driver's identifying characteristics (e.g., height, weight, hair color, birthdate, etc.), text corresponding to the license itself (e.g., issuing state, license number, etc.), document background (e.g., seals, logos, security features, etc.), and various other features. These elements may be arranged in any of a set of predetermined formats that are used by the respective issuing states. Generation of a simulated document can entail selecting a set of the document components (each of which may be fictitious and/or randomly generated) and plugging the components into one of the predetermined formats. The resulting dynamically generated simulated document therefore can have the same characteristics (photo, signature, text, etc.) as a genuine license, but does not include the private information of any real individual. (It should be noted that "dynamically generated" is used herein to indicate that the simulated document did not exist until it was created from the selected document components.)

Based on the simulated document, a simulated document image is generated (704). This image is a representation of the simulated document, which in this embodiment does not actually exist—it was instead generated from the document components and exists in the system's memory. The simulated document image is processed in this embodiment to include one or more of the images variations that are found in typical input images (706). For instance, the simulated image may be skewed so that the document (text) is angled with respect to horizontal, it may be tilted so that the scale of the document changes across the image (e.g., top to bottom or side to side), the document may be offset from the center of the image, the lighting may be made uneven across the image, or various other filters may be applied to the image to mimic effects that are found in typical input images.

It should be noted that, in addition to changing the simulated document image with image variations such as tilt, skew, centering, lighting, etc., variations may be introduced into the simulated document prior to the generation of the simulated document image through the generation of the simulated document using different fonts, colors and sizes for the document components. The use of different fonts, colors, sizes, etc. in the generation of the simulated documents will provide more variation in the corresponding images so that, when the convolutional neural network is trained with these images, it will help the system to perform even more robust detection.

Figure 8:
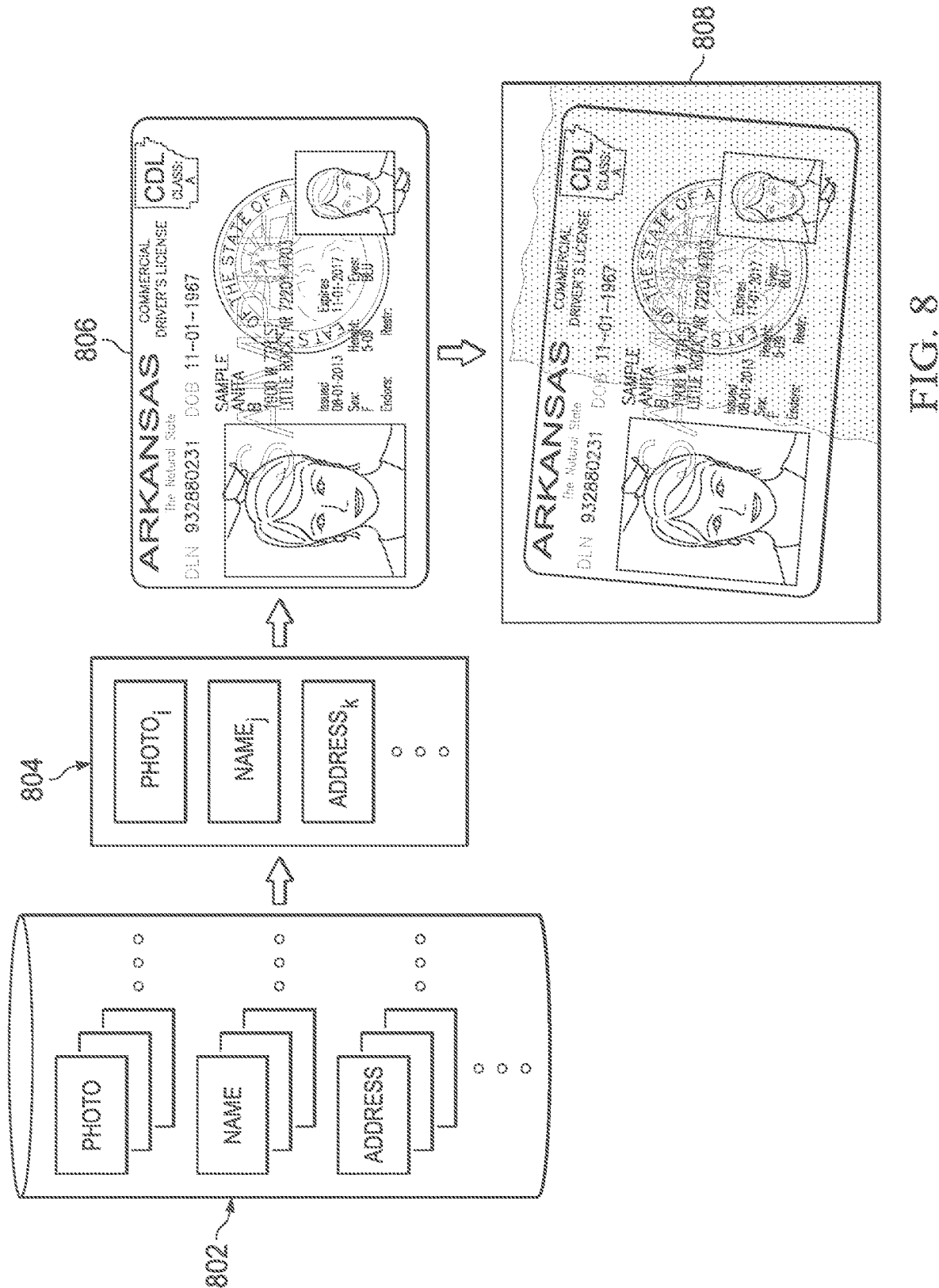
FIG. 8 depicts a diagrammatic representation of the generation of simulated documents and corresponding simulated document images based on a set of document components according to some embodiments.

Referring to FIG. 8, a diagram is provided to illustrate the creation of a simulated document image in accordance with one embodiment. As depicted in this figure, a set of document components 802 are initially stored in a memory or other data storage device, although they may be provided in some other manner in alternative embodiments. The set of document components includes components of various different types, such as names, addresses, photographs, document formats, signatures, and the like. There are multiple components within each of these component types. For example, within the category of photographs, there may be many different individual photograph document components. Similarly, there may be many different name document components, many different address document components, etc.

In step 702 of FIG. 7, a set of the document components is selected and used to generate a simulated document. The simulated document is shown as element 804 in FIG. 8. It can be seen that simulated document 704 includes one of the photograph document components ("photo,"), one of the name document components ("name,"), one of the address document components ("address$_k$"), and so on. Each of the selected document components is selected from the set of document components within the corresponding document component type. The particular document component from each type may be selected randomly, or in some ordered fashion. The simulated document will normally have format associated with it. For example, the simulated document may have the format of a California driver's license, or a New York driver's license, or some other type of document. The format may be one of the document components, and may consequently vary from one simulated document to the next, or the simulated documents may be generated according to one or more predetermined formats. Because the simulated document is not a tangible physical document, it may exist in various forms that allow it to be stored (in transitory or persistent form) and processed. For example, in one embodiment the simulated document may simply be the defined list of document components that have been selected to form the document (e.g., photograph$_i$, name$_j$, address$_k$, etc.).

Referring again to FIG. 8, the simulated document is then used to generate a simulated document image 806. Simulated document image may have any suitable image format, such as a JPEG, PNG, BMP, GIF, PDF, etc. The image format of the simulated document image will typically have the same format as the input images that are expected to be processed by the convolutional neural network after it has been trained, and the convolutional neural network will process the simulated document image and the expected input images in the same manner. In the example of FIG. 8, simulated document image 806 depicts the selected document components according to the selected format, but does not include image variations of the type that are commonly found in images that are input to the system for recognition. Simulated document image 806 is processed to incorporate some of these variations and thereby produce simulated document image 808. In simulated document image 808, the simulated document is slightly rotated and is offset from the center of the image. Although simulated document image 806 may be used in the training of the convolutional neural network, the trained convolutional neural network will normally be more robust if there is more variation in the training data set, so use of the simulated document image with the variations is preferred. It should be noted that it is not necessary to generate an unaltered image (e.g., image 806) prior to incorporating the image variations—the variations may be incorporated into the image as it is originally generated, producing the final image depicted as 808.

Referring to FIGS. 9A-9D, several examples of the types of variations that may be incorporated into the simulated document images are shown. Each of these figures depicts an image of a driver's license.

Figure 9A:
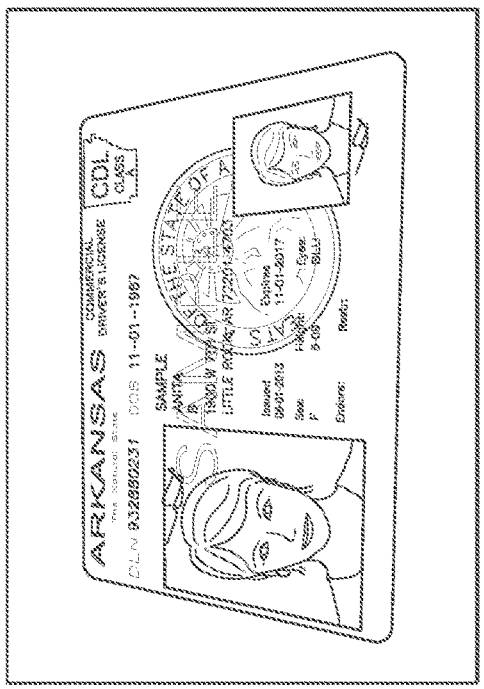
FIGS. 9A-9D depict several examples of image variations that may be incorporated into simulated document images that are generated according to some embodiments.
Figure 9B:
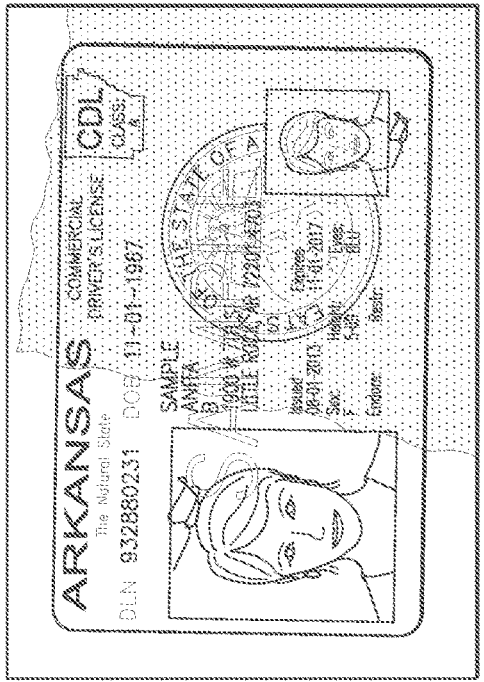
Figure 9C:
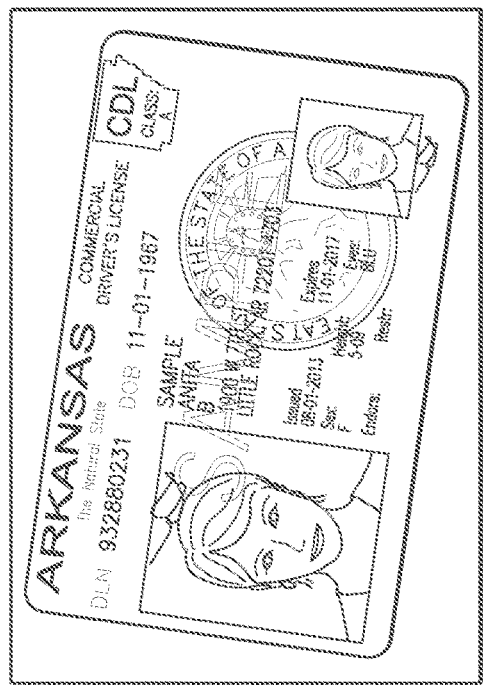
Figure 9D:
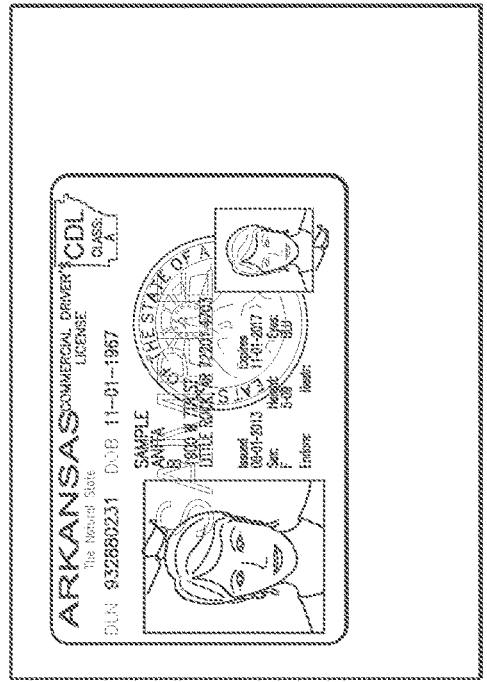

In FIG. 9A, the portion of the image depicting the driver's license is distorted as if the license were tilted when photographed, so that the opposing edges of the license are not parallel to each other. Consequently, the lines of text on the license will not be parallel, and the images and characters will be slightly distorted. In FIG. 9B, the lighting is uneven across the image (similar to having a shadow on part of the image). These figures illustrate just a few of the types of images variations that may be present in input images, and which may be incorporated into the simulated document images. In FIG. 9C, the portion of the image depicting the driver's license is slightly skewed or rotated, so that horizontal lines of text on the license are not horizontal in the generated image. In FIG. 9D, the portion of the image depicting the driver's license is offset from the center of the generated image.

Referring again to FIG. 7, as the simulated images are generated, they may be stored for use as a training data set. The information corresponding to the document components from which the simulated documents and simulated document images are generated may also be stored as part of the training data set. This data set is used to train the convolutional neural network (708). As an alternative to storing the simulated document images and the associated data, this information may be provided directly to the convolutional neural network to train it. During the training process, each simulated document image is processed by the convolutional neural network to recognize areas of the image in which there is a likelihood that particular features are found. The convolutional neural network may produce "heat maps" showing the relative likelihood (e.g., expressed as a percentage) of finding the particular features in specific areas of the image. Alternatively, the convolutional neural network may identify bounding boxes for the respective features, where the likelihood of finding a feature within a bounding box is greater than or equal to a defined threshold value, and the likelihood of finding the features outside the bounding box is less than the defined threshold value. The "boxes" may be irregularly shaped, and may include multiple enclosed areas.

The convolutional neural network may be configured simply to generate the heat maps or bounding boxes, or it may be further configured to extract information from the identified areas within the images. For instance, the convolutional neural network may extract text from areas that are identified as containing text, or it may extract sub-images (e.g. a photograph of a license owner) from the processed simulated document image. In either case, the output produced by the convolutional neural network is compared to a corresponding expected output, and the parameters of the convolutional neural network are adjusted as needed based on the comparison. For example, a generated heat map may be compared to a corresponding expected feature map, or a generated address may be compared to an expected address. If the output produced by the convolutional neural network is very close to the expected output, the adjustment to the parameters may be very small. If, on the other hand, the difference is greater, the adjustment to the parameters may likewise be greater. The adjustment of the parameters may be configurable by a user, as is known in the art.

There are a variety of methodologies and corresponding parameters that can be used to train the network. In one embodiment, the batch size is one image, the loss uses a weighted average (see J. Long, et al., "Fully Convolutional Networks for Semantic Segmentation,") and the learning rate is 0.001. An Adam optimizer (see D. Kingma, et al., "Adam: A Method for Stochastic Optimization," ICLR 2015) is used in the training of the convolutional neural network.

Because of the variables in the information that is used in the simulated documents, it is possible to generate a large number of documents from a very small amount of information. For instance, if only ten names, ten photos, and ten license formats are used, 1000 different simulated documents can be generated. With more variables (e.g., height, weight, hair color, birthdate, etc.) and more values for each of these variables, the number of different synthetic documents that can be generated for the training set rapidly increases. This number increases even further when the image variations such as varying fonts, colors, sizes, lighting, skew, tilt, etc. (as opposed to document information variations) are added to the images of the synthetic documents. The present embodiments therefore enable robust training of a convolutional neural network by someone who does not have access to large amounts of actual data (images of pre-existing documents and corresponding document information).

It should be noted that, although many variations of the simulated documents and images are possible, it may be preferable not to generate all of the variations that are possible from a given set of document components. This is because some of the variations may be small enough that the resulting images form a less effective training set than a comparable number of images that have greater variations between them. In other words, a training data set that has greater variations will train a neural network to recognize input images with greater variations, so the neural network will be more robust. For example, consider a first training data set that includes ten simulated images which are identical except for the names of the fictitious people associated with the images, and a second training data set that includes ten simulated images, each of which has a unique name, address, driver's license number, photograph and image variation (tilt, skew, etc.). Training a neural network with the second set will, in general, enable the neural network to recognize a wider variety of input images than if the neural network were trained with the first data set.

The methods disclosed herein provide other benefits in addition to the advantage of being able to generate large numbers of training images. One of these advantages is that it is not necessary to provide any means to determine the expected outputs which result from recognizing these documents—the expected outputs (information such as name, photo, signature, etc.) are known even before the images are generated, since this is the information that is used to generate the simulated images. By comparison, training a neural network with images of real, pre-existing documents requires that the information which is contained in the images be determined and provided to the neural network as expected outputs. Determining this information to be input to the system for training the convolutional neural network can itself be a time consuming and costly process (apart from obtaining and processing the images which are separately input to the convolutional neural network as part of the training process). It is therefore less costly to produce the training data set based on the dynamically generated, simulated documents and images as disclosed herein. Further, because the expected outputs are actually used to generate the images, the expected outputs are known with certainty, which may not be true of information extracted from actual, pre-existing documents.

The images generated using the methodology described above provide a training data set that includes a wide variety of image variations that might not be found in a set of collected images of actual documents. When the convolutional neural network is trained using this synthetic training data set, the network is more robust than networks that are trained using a captured training data set, and is better able to handle a wide range of document types and environments, and to handle unexpected variations in input images. It should be noted that, even though the convolutional neural network may have robust training through the use of this initial synthetic training data set, the network may continue to be trained as it processes actual images that are not part of a training data set.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. An image recognition system, comprising:
   a processor; and
   a non-transitory computer-readable medium; and
   stored instructions translatable by the processor to perform:
      obtaining a plurality of document components, wherein each document component represents a corresponding feature type;
      dynamically generating a plurality of images of simulated documents, each image being generated from a corresponding subset of the plurality of document components;
      providing the plurality of images as inputs to a convolutional neural network and providing, for each image, the corresponding feature types of the document components from which the image was generated as expected outputs; and
      training the convolutional neural network to recognize in the images the feature types of the corresponding document components.

2. The image recognition system of claim 1, wherein the one or more simulated document images incorporate one or more image variations, wherein the processor selects the one or more image variations from the group consisting of tilting, skewing, lighting variation, cropping, or decentering.

3. The image recognition system of claim 1, wherein the instructions are further translatable by the processor to perform:
receiving an input image from an input/output device communicatively connected to the image recognition system over a network;
performing, using the trained convolutional neural network, a set of convolutional operations on the input image so as to produce one or more heat maps, wherein each of the heat maps indicates a probability of finding a corresponding one of the feature types at each pixel in the heat map; and
extracting, from the input image, one of the feature types from an area of the input image indicated by the corresponding one of the heat maps.

4. The image recognition system of claim 3, wherein the convolutional neural network produces heat maps corresponding to feature types including: text; face; signature; document background; and image background.

5. The image recognition system of claim 3, wherein the processor comprises one or more computers that form a public cloud network.

6. The image recognition system of claim 3, wherein the input/output device comprises a mobile client device.

7. The image recognition system of claim 3, wherein the processor performs preprocessing on each input image prior to providing the preprocessed image to the convolutional neural network, wherein the preprocessing includes at least conversion of colors to grayscale.

8. The image recognition system of claim 1, wherein the instructions are further translatable by the to perform:
receiving an input image from an input/output device communicatively connected to the image recognition system over a network;
performing, using the trained convolutional neural network, a set of convolutional operations on the input image so as to produce one or more bounding boxes, wherein each of the one or more bounding boxes indicates an area of the input image in which a corresponding feature type is located; and
extracting, from the input image, each feature type from the area of the input image indicated by the corresponding bounding box.

9. A method, comprising:
obtaining a plurality of document components, wherein each document component represents a corresponding feature type;
dynamically generating a plurality of images of simulated documents, each image being generated from a corresponding subset of the plurality of document components;
providing the plurality of images as inputs to a convolutional neural network and providing, for each image, the corresponding feature types of the document components from which the image was generated as expected outputs; and
training the convolutional neural network to recognize in the images the feature types of the corresponding document components.

10. The method of claim 9, wherein dynamically generating the simulated document image from the simulated document for each of the subsets of the plurality of document components further comprises implementing one or more image variations in the simulated document image, wherein the one or more image variations are selecting from the group consisting of tilting, skewing, lighting variation, cropping, or decentering.

11. The method of claim 9, wherein training the convolutional neural network comprises:
performing image recognition processing on the one or more simulated document images and thereby producing a corresponding set of recognition outputs;
comparing the set of recognition outputs to the expected outputs for the one or more simulated document images; and
adjusting a set of weights of the convolutional neural network in dependence upon differences between the set of recognition outputs and the expected outputs for the one or more simulated document images.

12. The method of claim 9, further comprising:
providing one or more captured images to the convolutional neural network; and
performing, by the convolutional neural network, image recognition processing on the captured images, wherein the image recognition processing includes:
performing a set of convolutional operations on the captured images and thereby determining or identifying, for each of the captured images, one or more corresponding heat maps, wherein each of the heat maps indicates a probability of finding the corresponding feature type at each pixel in the heat map; and
extracting information from the input images, wherein for each of the input images, information corresponding to a specific feature type is extracted from an area of the input image indicated by the heat map corresponding to the specific feature type.

13. The method of claim 12, wherein the convolutional neural network produces heat maps corresponding to feature types including text, face, signature, document background, and image background.

14. The method of claim 12, further comprising:
receiving the one or more captured images from an input device.

15. The method of claim 14, wherein the input device comprises a mobile client device.

16. The method of claim 12, further comprising:
performing preprocessing on each captured image prior to providing the captured image to the convolutional neural network, wherein the preprocessing includes at least conversion of colors to grayscale.

17. The method of claim 9, further comprising:
providing one or more captured images to the convolutional neural network; and
performing, by the convolutional neural network, image recognition processing on the captured images, wherein the image recognition processing includes:
performing a set of convolutional operations on the captured images and thereby determining or identifying, for each of the captured images, one or more corresponding bounding boxes, wherein each of the bounding boxes indicates an area of the captured image in which a corresponding feature type is located; and
extracting information from the input images, wherein for each of the input images, information of a specific feature type is extracted from the area of the input image indicated by the bounding box corresponding to the specific feature type.

18. A computer program product comprising a non-transitory computer-readable medium storing instructions translatable by one or more processors to perform:
  obtaining a plurality of document components, wherein each document component represents a corresponding feature type;
  dynamically generating a plurality of images of simulated documents, each image being generated from a corresponding subset of the plurality of document components;
  providing the plurality of images as inputs to a convolutional neural network and providing, for each image, the corresponding feature types of the document components from which the image was generated as expected outputs; and
  training the convolutional neural network to recognize in the images the feature types of the corresponding document components.

19. The computer program product of claim 18, wherein the instructions are further translatable by the one or more processors to perform:
  performing image recognition processing on the one or more simulated document images and thereby producing a corresponding set of recognition outputs;
  comparing the set of recognition outputs to the expected outputs for the one or more simulated document images; and
  adjusting a set of weights of the convolutional neural network in dependence upon differences between the set of recognition outputs and the expected outputs for the one or more simulated document images.

20. The computer program product of claim 19, wherein the instructions are further translatable by the one or more processors to perform:
  providing one or more captured images to the convolutional neural network; and
  performing, by the convolutional neural network, image recognition processing on the captured images, wherein the image recognition processing includes:
    performing a set of convolutional operations on the captured images and thereby determining or identifying, for each of the captured images, one or more corresponding heat maps, wherein each of the heat maps indicates a probability of finding the corresponding feature type at each pixel in the heat map; and
    extracting information from the input images, wherein for each of the input images, information corresponding to a specific feature type is extracted from an area of the input image indicated by the heat map corresponding to the specific feature type.

* * * * *